Patented Apr. 8, 1941

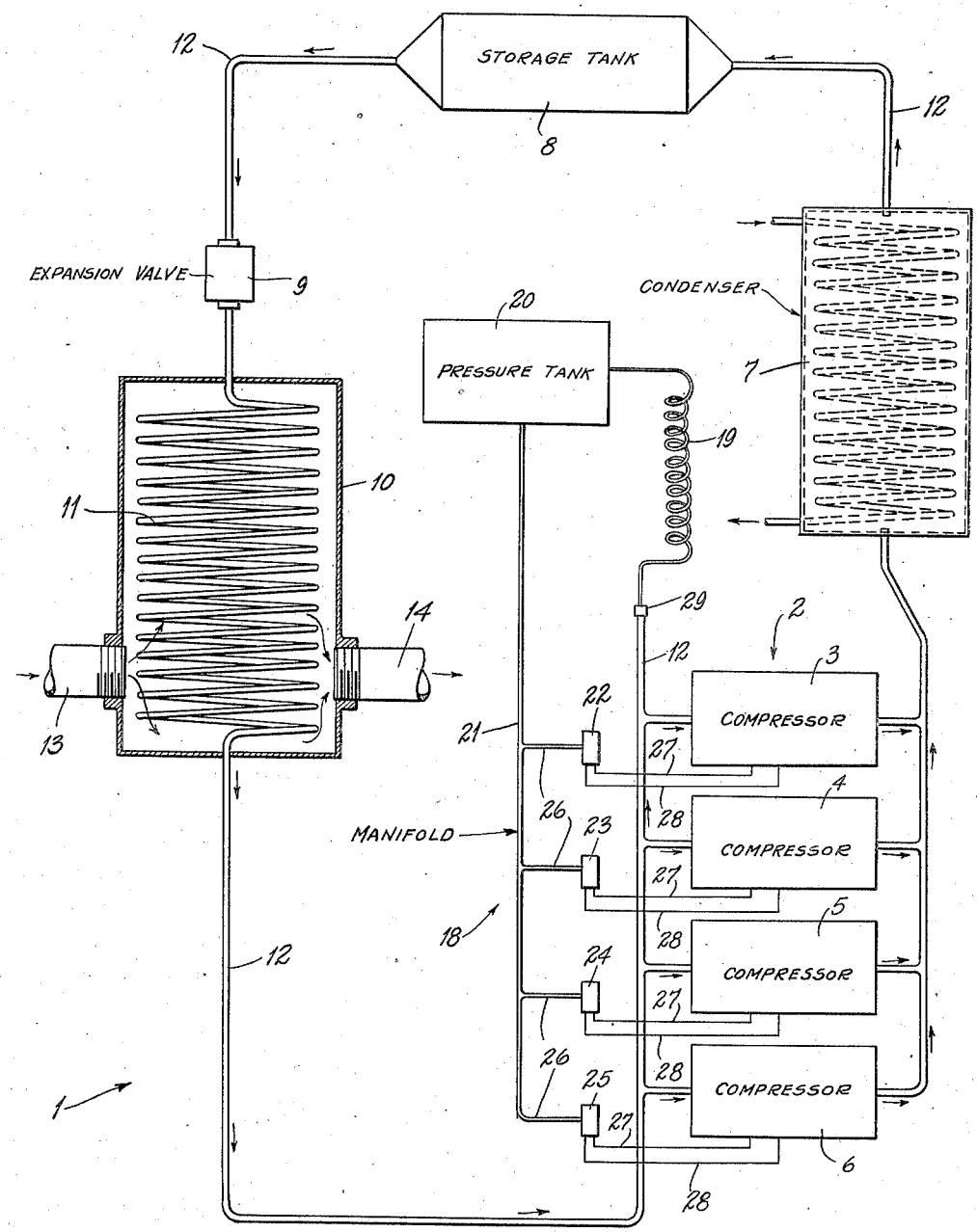

2,237,574

UNITED STATES PATENT OFFICE 2,237,574

CONTROL SYSTEM

Lawrence M. Persons, St. Louis County, Mo., assignor to Automatic Control Corporation, St. Louis, Mo., a corporation of Delaware Application December 24, 1937, Serial No. 181,648

9 Claims. (Cl. 62—4)

The present invention relates generally to controls, and more particularly to a control system adapted to be advantageously employed for unloading and loading a refrigerating machine or system.

An object of the present invention is to provide a control system which automatically loads and unloads a refrigerating machine or system.

Another object is to provide a control which is adapted to be used in combination with a refrigeration machine or system which includes a battery of compressors to shut off and start said compressors in predetermined succession as the load upon the machine or system decreases or increases.

Another object is to provide a control adapted to be used to start and stop the compressors of a refrigeration machine, system, or the like, which functions without hunting.

Another object is to provide a control which embodies a plurality of pressure switches, and means for preventing hunting in the operation of the switches.

Another object is to provide a control which efficiently and effectively shuts off and starts a refrigeration machine or system in predetermined stages.

Another object is to provide a control which is simple in construction, inexpensive, and adapted to be readily installed.

Other objects and advantages will be apparent from the following description, taken in connection with the accompanying drawing, in which:

The figure shows diagrammatically a refrigeration system having a control constructed in accordance with the concepts of the present invention operatively connected therewith.

Referring to the drawing more particularly by reference numerals, there is shown diagrammatically a refrigeration system 1 which comprises a bank of compressors 2 including four compressors designated 3, 4, 5, and 6, a condenser 7, a storage tank 8, an expansion valve 9, a cooling chamber 10 which encloses a cooling coil 11, and connecting pipes 12. The cooling chamber 10 has pipes 13 and 14 leading thereinto and therefrom, respectively, by means of which air, or the like, being cooled enters and leaves the cooling chamber 10.

A novel control 18 is provided which includes a capillary tube 19, a pressure tank 20, a manifold 21, pressure switches 22, 23, 24, and 25, and connections 26 between the manifold 21 and the switches 22—25. Leads 27 and 28 electrically connect switches 22—25 with the motors (not shown) of the compressors 3—6, respectively.

The capillary tube 19 is connected into the refrigeration system at 29. The diameter of the capillary tube 19 is substantially smaller than the diameters of the several pipes 12. The diameters of the manifold 21 and the connections 26 are relatively small in a predetermined relationship with the diameter of the capillary tube 19.

Operation

Each of the switches 22—25 is set to automatically shut off its respective compressor at a predetermined pressure of the cooling medium within the pipes 12 adjacent said compressor and in the connection 26 adjacent the said switch, and to start its respective compressor at a predetermined higher pressure at said points. Hence, a predetermined differential is obtained between the start setting of the switch 22 and the stop setting of the switch 25.

For illustration, the switch 22 is set to stop the compressor 3 when the pressure within the connection 26 drops to 37 pounds and to start the compressor 3 when the pressure within the connection 26 rises to 40 pounds. Similarly, the switch 23 stops and starts the compressor 4 at 36 and 39 pounds pressure, respectively, in the adjacent connection 26; the switch 24 stops and starts the compressor 5 at 35 and 38 pounds pressure, respectively, in the adjacent connection 26; and the switch 25 stops and starts the compressor 6 at 34 and 37 pounds pressure, respectively, in the adjacent connection 26.

Further, assume that all four compressors are functioning, that the pressure of the cooling medium just above the expansion valve is 100 pounds, and that the pressure in the pipes adjacent the compressors at the entrance side is 42 pounds. Correspondingly, the pressure within the manifold 21 and the connections 26 will be substantially 42 pounds, since this pressure has been reached gradually. The capillary tube 19 and the pressure tank 20 permit the pressure within the manifold 21 and the connections 26 to fall or rise gradually in accordance with the pressure within the pipe 12 adjacent the connection 29.

In accordance with refrigeration systems, the pressure of the cooling medium drops from 100 pounds at a point above the expansion valve 9 to some pressure as the assumed pressure 42 adjacent the compressors, for the cooling medium is expanded by the expansion valve 9, reducing the temperature thereof, increasing the volume, and reducing the pressure. As the cooling medium passes through the cooling coil 11, heat within the cooling chamber 10 is absorbed thereby, which raises the temperature of the cooling medium. Hence, initially, as the cooling medium leaves the cooling chamber 10, it will comprise a certain volume at, say, 70° temperature and at 42 pounds pressure.

However, as the air, or the like, being cooled within the cooling chamber 10 has the heat content removed therefrom by the cooling medium, the temperature of the cooling medium leaving the cooling chamber 10 will gradually decrease. As the temperature of the cooling medium past the expansion valve drops, then, in accordance with the well known equation $PVT' = P'V'T$, the pressure and the volume thereof past the expansion valve will decrease. As the volume of the cooling medium decreases, the required number of compressors necessary to compress the cooling medium will correspondingly decrease. Hence, as soon as the pressure of the cooling medium within the pipe sections 12 adjacent the compressors and within the manifold 21 and connections 26 drops to 37 pounds, the switch 22 opens and stops the compressor 3.

When the compressor 3 is taken out of service, the burden of compressing the cooling medium available at the compressors is thrown upon the remaining compressors 4, 5, and 6. Before the compressors 4, 5, and 6 can take on the additional load, the pressure of the cooling medium adjacent thereto is raised because the volume of the cooling medium is compressed or decreased due to accumulation of the cooling medium at the compressors. This pressure may rise to 41 pounds, which would immediately occasion the starting of the compressor 3 were some means not provided to prevent it.

This means comprises the capillary tube 19 and the pressure tank 20 which prevent rapid passage of the cooling medium therethrough and which, therefore, do not immediately pass to the manifold 21 the higher pressure cooling medium adjacent the compressors. The tank 20 is of a capacity to absorb the pressure and allows the use of a larger capillary tube. A sufficiently small capillary tube can be employed alone. This block permits the compressors 4, 5, and 6 to readjust themselves to the greater load which, of course, requires but a very short period of time. The pressure within the manifold 21 may rise slightly, but not sufficiently to restart the compressor 3.

Therefore, hunting is eliminated. That is, the compressor 3 is not restarted and stopped two or three times before the compressors 4, 5, and 6 absorb the additional load thrown upon them by the stopping of the compressor 3. Were the switches 22—25 connected directly to the pipe 12 adjacent the compressors, then hunting would be inevitable.

The switches 23, 24, and 25 function similarly to the switch 22 to shut off and start their respective compressors.

It is thus apparent that there has been provided a control for refrigerating machines and systems which is adapted to unload and load the same without involving that objectionable feature known as hunting. Further, the control is simple, accurate, and in all respects adapted to fulfill the objects and advantages sought therefor. The selected temperatures, pressures, and the like are, of course, illustrative. Further, any desired operative differential is obtainable.

It is to be understood that the foregoing description and accompanying drawing have been given by way of illustration and example and not for purposes of limitation, the invention being limited only by the claims which follow.

What is claimed is:

1. In combination, a refrigeration system including a plurality of compressors and a cooling medium line containing cooling medium, and a control comprising a plurality of pressure switches, means operatively connecting said pressure switches to the said cooling medium line, means electrically connecting said switches to said compressors, and means connected in said first means for preventing sudden pressure changes within the said pressure line from being immediately conveyed to said switches.

2. In combination, a refrigeration system including a plurality of compressors and a cooling medium line including cooling medium, and a control for said system including means operatively connected to said compressors and said system to consecutively stop or start the same substantially without hunting on the part of an individual compressor control, said means including pressure switches connected to the cooling medium line, one of which is operatively connected to each of said compressors, and means disposed in the connection between the pressure switches and the cooling medium line adapted to prevent hunting of said pressure switches in operation.

3. In combination, a refrigeration system including a plurality of compressors and a fluid line, and a control for said system including means operatively connected to said compressors and into said system to consecutively stop or start the same substantially without hunting on the part of an individual compressor control, said means including pressure switches, one of which is connected to each of said compressors, and a capillary tube disposed between the switches and the fluid line of the refrigeration mechanism.

4. In combination, a refrigeration system including a plurality of compressors and a cooling medium line containing cooling medium, and a control comprising a plurality of pressure switches, a fluid line connecting said switches to said cooling medium line, means electrically connecting said switches to said compressors, and a capillary tube disposed in said fluid line preventing hunting of said switches.

5. In combination, a refrigeration system including a plurality of compressors and a cooling medium line including cooling medium under pressure, means actuated by the pressure of the cooling medium for individually starting and stopping said compressors, and means connected into the cooling medium line and to the pressure actuated means to prevent hunting of said pressure actuated means.

6. In combination, a refrigeration system including a plurality of compressors and a cooling medium line including cooling medium under pressure, pressure switches actuated by the pressure of the cooling medium for individually starting and stopping said compressors, and means connected into the cooling medium line and to said pressure switches to prevent hunting of said pressure switches.

7. In combination, a refrigeration system including a plurality of compressors and a cooling medium line including cooling medium under pressure, pressure switches actuated by the pressure of the cooling medium for individually starting and stopping said compressors, and means to prevent hunting of said pressure switches, said means comprising a capillary tube and a pressure tank disposed in the connection between the switches and the cooling medium line.

8. A control comprising a plurality of pressure switches, means connecting said switches with a main body of an actuating medium, means electrically connecting said switches with controlled devices, and means in said first means preventing sudden transmission of pressure from said main body of actuating medium to said switches, said last means including a capillary tube and a pressure tank.

9. A control comprising a plurality of pressure switches, means connecting said switches with a main body of an actuating medium under changing pressure, means electrically connecting said switches with controlled devices adapted to consecutively assume and to be released from a load, each of said pressure switches being actuatable to release its operatively connected controlled device from its load and to cause it to assume its load at different pressures from the other pressure switches, and means in said first means preventing sudden transmission of pressure from said main body of actuating medium to said switches, so that a controlled device can be released of its load and the load assumed by the other controlled devices without hunting on the part of the switch of the released controlled device.

LAWRENCE M. PERSONS.